United States Patent [19]

DeCesare

[11] Patent Number: 4,488,075
[45] Date of Patent: Dec. 11, 1984

[54] ALTERNATOR WITH ROTOR AXIAL FLUX EXCITATION

[76] Inventor: Dominic DeCesare, 223 Center St., Elizabeth, N.J. 07202

[21] Appl. No.: 315,260

[22] Filed: Oct. 26, 1981

[51] Int. Cl.³ .............................................. H02K 21/12
[52] U.S. Cl. ................................ 310/156; 310/114; 310/208; 310/216; 310/263; 310/259; 310/268
[58] Field of Search ........ 310/152, 156, 159, 216–218, 310/158, 195, 263, 208, 257, 268, 265, 267, 254, 194, 255, 49 R, 258, 259, 112, 114, 167, 168, 171, 265, 179, 180, 164, 165, 167; 324/146

[56] References Cited

U.S. PATENT DOCUMENTS

| | | | |
|---|---|---|---|
| 2,235,151 | 3/1941 | Gillen | 310/216 UX |
| 3,252,025 | 5/1966 | Brown | 310/263 |
| 3,423,619 | 1/1969 | Schaw | 310/263 |
| 3,553,510 | 7/1968 | Howey | 310/156 |
| 3,671,906 | 6/1972 | Hodges | 310/263 |
| 3,700,942 | 10/1972 | Alth | 310/268 |
| 3,714,484 | 1/1973 | Habert | 310/263 |
| 3,803,431 | 4/1974 | Inabh | 310/216 |
| 3,956,651 | 5/1976 | Brammerlo | 310/218 |
| 4,187,441 | 2/1980 | Oney | 310/156 |
| 4,206,374 | 6/1980 | Godditn | 310/49 R |
| 4,237,396 | 12/1980 | Blenkinsop | 310/268 |
| 4,242,610 | 12/1980 | McCarthy | 310/156 |
| 4,255,684 | 3/1981 | Mischler | 310/217 |

*Primary Examiner*—R. Skudy
*Attorney, Agent, or Firm*—Lilling & Greenspan

[57] ABSTRACT

An alternator is provided with a rotor which optimizes magnetic flux both at the periphery as well as at the opposed axial surfaces of the rotor, and the magnetic flux is coupled to the stator armature coils either by disposing armature coils proximate to some of the rotor surfaces and coupling to these coils from the other surfaces by use of magnetic extensions which bridge the distance between the other surfaces and the armature coils. The alternator, therefore, maximizes the usable magnetic flux established by the rotor at both its peripheral and opposed axial surfaces and the stator armature structure is configured to optimize coupling to this now increased rotating flux field.

25 Claims, 10 Drawing Figures

ALTERNATOR WITH ROTOR AXIAL FLUX EXCITATION

BACKGROUND OF THE INVENTION

This invention relates to electric rotating machines and, particularly, to an AC alternator which optimizes magnetic flux coupling between a rotor and stator armature coils.

Because the linear velocity of a rotating rotor is greatest at its periphery or point of maximum radius, rotating machines have traditionally relied on the peripheral surface of the rotor for establishment of magnetic flux. This magnetic field, having the greatest linear velocity, is most effective to induce voltages in armature coils which are arranged in the stator to couple with the peripheral magnetic field of the rotor. However, what has not been fully appreciated is that the rotor also has axial surfaces which rotate as well and which, while these may be less effective, can provide a rotating magnetic field which, with suitably designed stator armatures can be instrumental to develop additional voltages.

The conventional alternator designs, which are based reliance on only peripheral magnetic flux fields, are necessarily limited in their efficiencies to the maximum amount of coupling between the peripheral rotor flux field and the armature coils arranged in the stator to couple with the peripheral flux field. While the peripheral flux field of the rotor is not restricted to the periphery and, some leakage flux exists in the regions of the axial surfaces of the rotor, such leakage of fluxes are merely incidental to the primary peripheral field and do not significantly increase the efficiency of the overall machine. Firstly, the leakage fluxes are generally weak fields. Secondly, and equally importantly, the stator designs are not such as to capitalize on the axial or lateral fields since no coupling mechanism was provided for coupling to these fields.

SUMMARY OF THE INVENTION

Accordingly, it is an object of the present invention to provide an AC alternator which does not exhibit the above described disadvantages.

It is another object of the present invention to provide an AC alternator which is simple in construction and economical to manufacture.

It is still another object of the present invention to provide an AC alternator which substantially increases the efficiency over conventional alternator designs.

It is a further object of the present invention to provide an AC alternator which establishes magnetic flux fields both at the peripheral as well as at the axial surfaces of the rotating rotor, with the stator being designed to couple to all of the rotor flux fields.

It is still a further object of the present invention to provide an AC alternator which exhibits increased efficiencies with slightly modified designs of existing AC alternators.

It is yet a further object of the present invention to provide an AC alternator which provides significantly greater outputs with the same energy inputs, or providing the same outputs at substantially lower energy inputs.

It is an additional object of the present invention to provide an AC alternator which provides increased efficiencies without sacrificing existing alternator designs or ease of operation.

It is yet an additional object of the present invention to provide an AC alternator which can be stacked or cascaded to provide a multiplicity of outputs while driving a single common shaft.

In order to achieve the above objects, as well as others which will become apparent hereafter, an AC alternator in accordance with the present invention comprises a driven shaft and a rotor mounted on the shaft for rotation therewith. The rotor has peripheral and axial surfaces and includes means for establishing flux at the peripheral surface and at least partially at the axial surfaces of the rotor. A stator is provided which includes armature coils distributed thereon and arranged proximate to said rotor to magnetically couple with the flux at said peripheral and axial surfaces to thereby enhance voltage induction.

BRIEF DESCRIPTION OF THE DRAWINGS

Other and further objects of this invention will be more apparent hereinafter from an examination of the specification and claims in conjunction with the accompanying drawings, wherein:

DETAILED DESCRIPTION OF THE PREFERRED EMBODIMENTS

Figure 1:
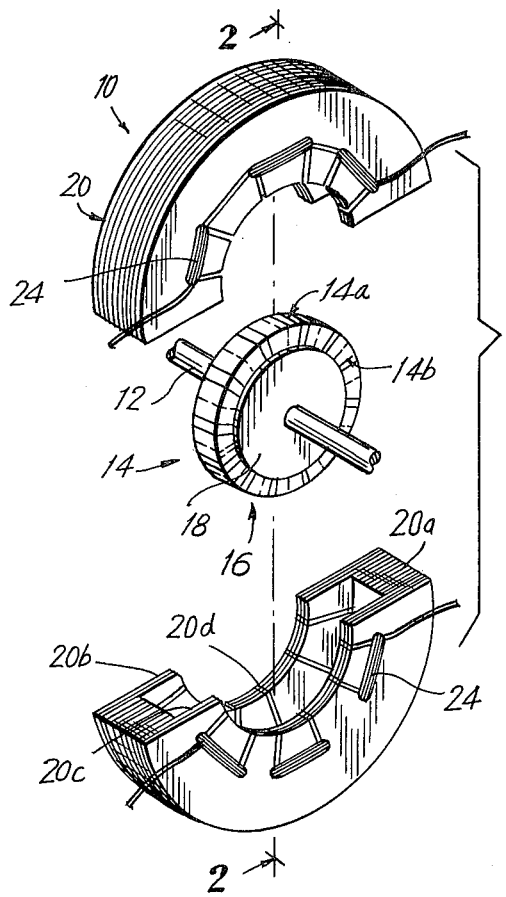
FIG. 1 is an exploded view, in perspective, of an alternator in accordance with the present invention which includes peripheral armature windings and axial radially directed wall portions for coupling with the axial or lateral rotor flux.
Figure 2:
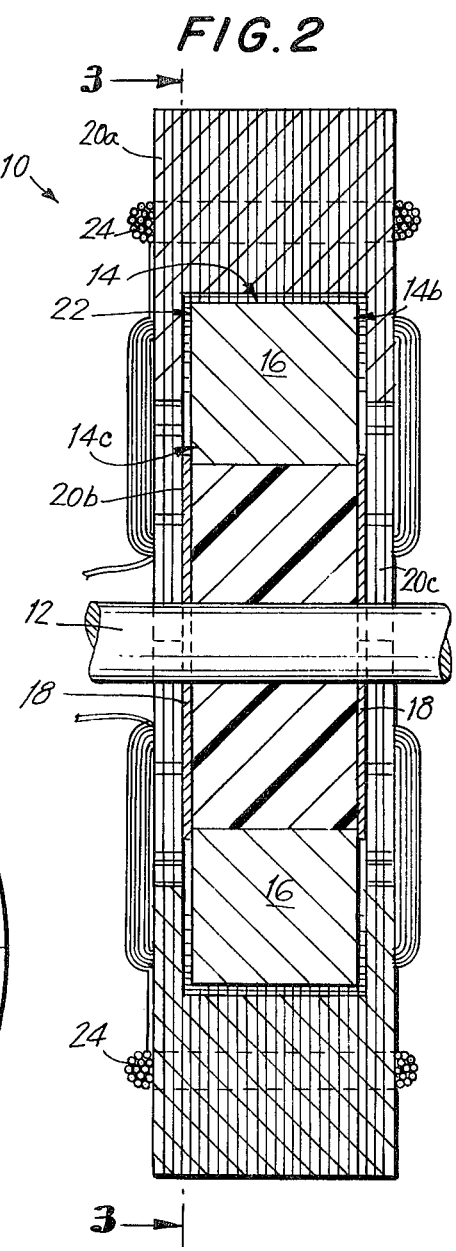
FIG. 2 is an enlarged cross-sectional view of the assembled alternator of FIG. 1 taken along line 2—2.
Figure 3:
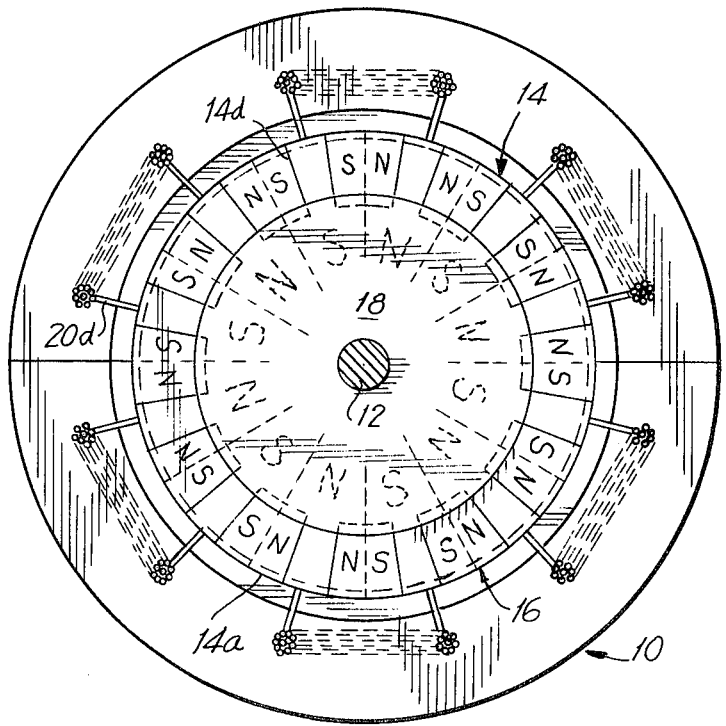
FIG. 3 is a cross-sectional view of the alternator shown in FIG. 2, taken along line 3—3.

Referring now specifically to the figures, in which the identical or similar parts are designated by the same reference numerals throughout, and first referring to FIGS. 1-3, an alternator in accordance with the present invention is generally designated by the reference numeral 10.

The alternator 10 includes a driven shaft 12 on which there is mounted a rotor 14 for common rotation with the shaft 12. The rotor 14 has a peripheral or circumferential surface 14a and axial or lateral surfaces 14b and 14c.

An important feature of the present invention is that the rotor 14 is provided with magnetizing means for establishing a magnetic flux at the peripheral surface 14a and at least partially at the axial surfaces 14b and 14c of the rotor 14. In the embodiment shown in FIGS. 1-3, the rotor is in the nature of a non-magnetic drum having axially directed recesses 14d about the peripheral surface 14a substantially equally spaced from each other. Each recess is generally defined by two radial lines or planes circumferentially spaced from each other and by two arcuate surfaces radially spaced from each other, to thereby form generally trapezoidal recesses or grooves which extend the entire axial thickness of the rotor 14. In this embodiment, the magnetizing means is in the nature of permanent magnet sections 16 which are set into the recesses 14d and which have lengths substantially equal to the axial thickness of the rotor 14 to thereby expose the permanent magnetic sections 16 at the peripheral surface 14a and axial surfaces 14b and 14c of the rotor 14. The permanent magnetic sections 16 are magnetized as shown in FIG. 3 to provide opposing magnetic polarities along the peripheral or circumferential direction of the rotor 14, and peripherally adjacent permanent magnetic sections 16 have like magnetic polarities in opposition to each other. Thus, the permanent magnetic sections 16 are arranged to provide alternating North and South polarities about the periphery of the rotor.

Where the rotor is comprised of permanent magnetic section inserts 16, there may advantageously be provided a retaining plate or disc 18 which abuts against each axial surface 14b and 14c of the rotor 14 as shown in FIGS. 1-3. By selecting the diameter of the retaining plate 18 so that it just slightly overlaps the permanent magnetic sections 16 as shown in FIG. 3, the plate 18 prevents relative axial shifting between the rotor and the magnetic sections. It will be appreciated that with the construction shown in FIGS. 1-3, magnetic flux will be established by the permanent magnetic sections both at the peripheral surface 14a as well as at the axial or lateral surfaces 14b and 14c of the rotor. The same magnetic flux conditions can be established by the use of a solid disc or drum having at least peripheral portions thereof magnetized throughout the axial thickness thereof to establish a magnetic flux at all of the aforementioned rotor surfaces. Referring to FIG. 3, the magnetization pattern or map is indicated in dashed or phantom outline, with the polarities of each of the thus created magnetized sections or sectors likewise being shown in phantom outline. Magnetically, the two arrangements, solid drum, on the one hand, or the non-magnetized drum with permanent magnet inserts, on the other hand, are practically identical.

Another important feature of the present invention is the provision of a stator which includes armature coils distributed thereon and arranged proximate to the rotor to magnetically couple with the flux at the peripheral and axial surfaces to thereby enhance voltage induction. In the embodiment shown in FIGS. 1-3, the stator is generally designated by the reference numeral 20 which includes a central section or portion 20a proximate to and in opposed relationship to the rotor peripheral surface 14a. Extending radially inwardly are axial wall portions 20b and 20c which are proximate to and in opposed relationship to respective ones of the rotor axial surfaces 14b and 14c to provide sufficient clearances 22 between the rotor and stator.

In the embodiment of FIGS. 1-3, armature coils 24 are arranged as shown substantially about the stator central portion 20a. The axial wall portions 20b and 20c are substantially flat and are arranged to bridge or extend into the lateral flux fields to thereby cause the flux at the rotor axial surfaces to be coupled to the armature coils 24 in the slots 20d. The lateral or axial flux fields contribute to the overall voltages induced in the armature coils 24. This enhancement in induced voltage is achieved merely by creating the axial or lateral flux fields about the rotor and by extending the axial wall portions 20b and 20c into the regions of those lateral or axial flux fields.

The stator 20 of the embodiment shown in FIGS. 1-3 advantageously comprises laminations stacked in the axial direction.

Figure 4:
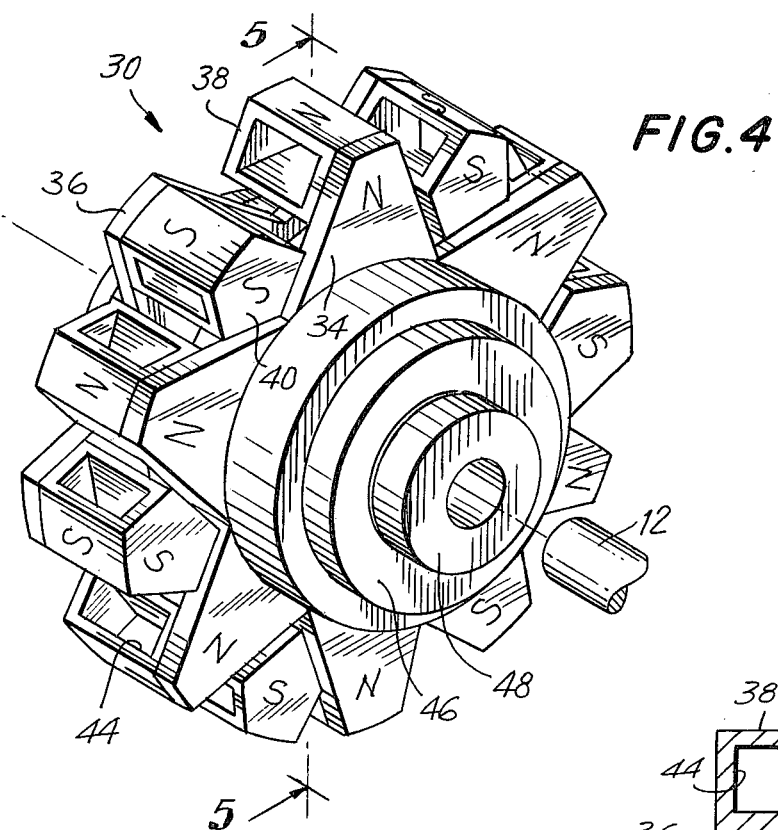
FIG. 4 is a perspective view of an interlacing pole rotor structure in accordance with the present invention.
Figure 5:
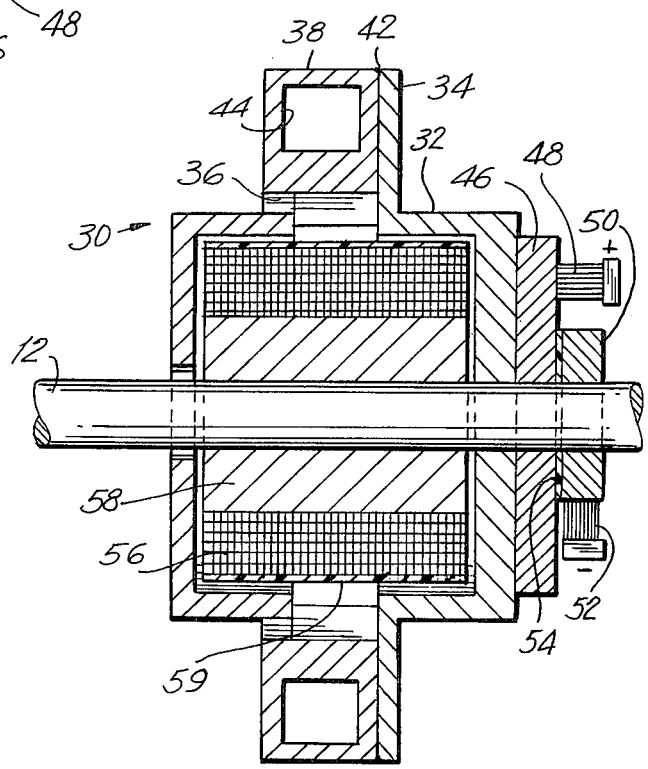
FIG. 5 is a cross-sectional view of the rotor shown in FIG. 4, taken along line 5—5.

Referring to FIGS. 4 and 5, a construction of a rotor is shown which also embodies the features of the present invention. The rotor 30 includes a core structure 32 having a core side wall 34, at one axial side, and a core side wall 36, on the other axial side. Successively mounted on these core side walls 34, 36 are two sets of poles 38, 40. Thus, all of the poles 38, being north poles, are mounted on the core side wall 34, while all of the south poles 40 are mounted on the core side wall 36. The respective poles 38, 40 interleave with each other as shown so as to present magnetic flux fields both at the periphery of the rotor 30, as well as at the lateral or axial sides thereof.

The poles may be fastened or connected to the core side walls in any conventional manner, such as by providing welds 42. Also, in order to lower the overall mass of the rotor, as well as in order to effect economies in manufacture, the poles 38, 40 are advantageously provided with hollow cavities 44.

Magnetic flux is established in the rotor 30 by providing a slip ring 46 which is in contact with the brush 48 and a slip ring 50 which is in contact with a brush 52, the slip rings 46 and 50 being isolated from each other by insulation 54. The slip rings are, in turn, connected to an axial rotor field coil 56 which is mounted on a ferrous core 58. Passage of a current through the field coil 56 establishes a magnetic intensity in the magnetic circuit of the rotor to establish the magnetic flux field not only about the periphery of the rotor 30, but also at the lateral or axial sides thereof. The field coil 56 may be protected in a conventional manner by use of a plastic wrapping 59 as shown.

Figure 6:
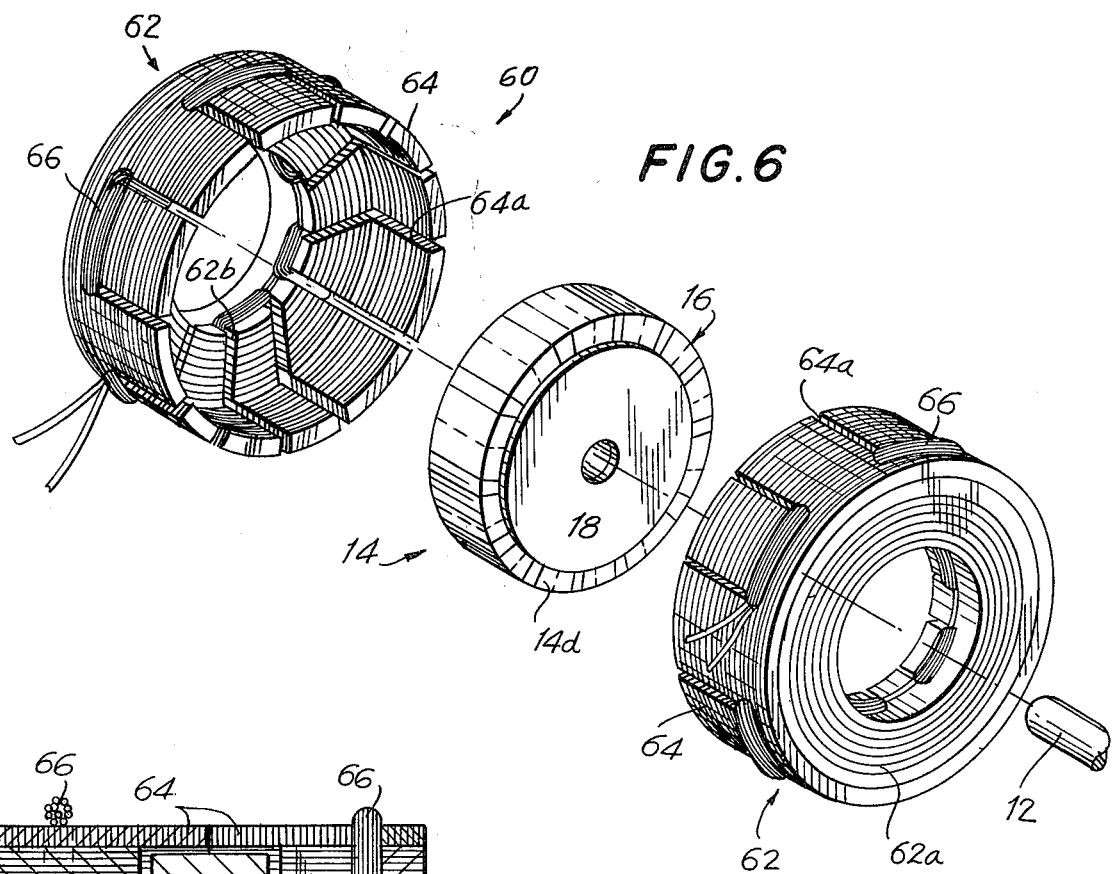
FIG. 6 is an exploded view, in perspective, of another embodiment of the alternator in accordance with the present invention which includes stator axial end sections with armature coils provided thereon, and axially inwardly projecting pole extensions for coupling the flux available at the periphery of the rotor.
Figure 7:
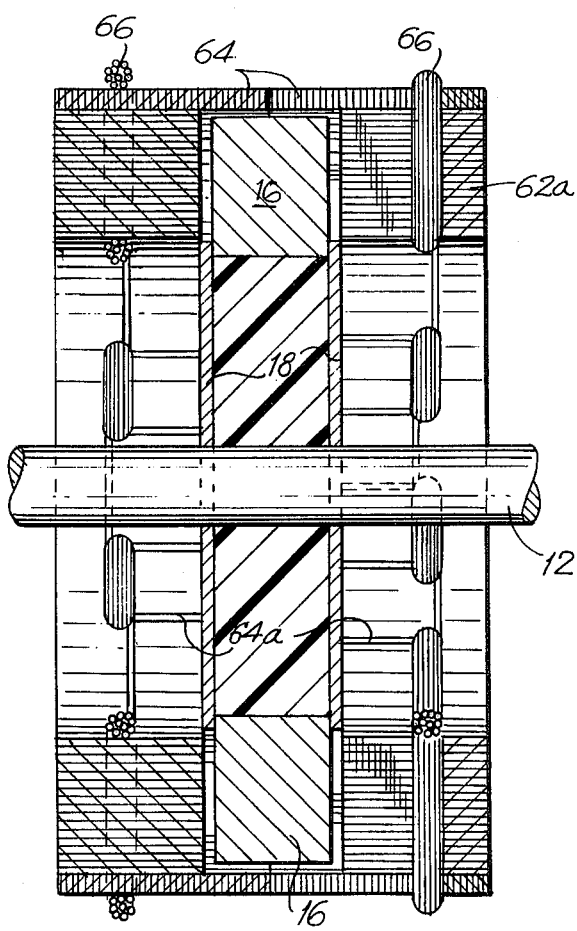
FIG. 7 is an enlarged cross-sectional view, taken along a diametrical plane, of the embodiment shown in FIG. 6.

Turning now to FIGS. 6 and 7, another embodiment of the alternator is illustrated and designated by the reference numeral 60. The alternator includes axial end sections 62 which may be formed of concentric circular laminations 62a and which are provided with radial internal slots or grooves 62b as shown. Also provided are pole extensions 64 likewise provided with axial slots 64a which are aligned with the slots 62b as shown in FIGS. 6. The pole extensions 64 are shown formed of laminations stacked in the axial direction. When the alternator 60 is assembled, as shown in FIG. 7, the pole extensions 64 are in opposition to the rotor peripheral surface 14a. In this embodiment the armature coils 66 are provided on the axial end sections 62 proximate to the rotor axial surfaces. In this manner, the peripheral flux of the rotor is coupled to the armature coils 66 through the pole extensions 64.

The alternator 10 shown in FIGS. 1-3 and the alternator 60 shown in FIGS. 6 and 7 share the common feature that they utilize the field flux established about the periphery and at the axial or lateral surfaces of the rotor. In the alternator 10 the peripheral field flux is coupled directly to the armature coils or windings 24 while the lateral field flux is picked up through the axial wall portions 20b and 20c. In the alternator 60, on the other hand, it is the axial or lateral fluxes which are picked up directly by the armature coil or windings 66 while it is the peripheral field flux that is picked up indirectly by means of the pole extensions 64.

Figure 8:
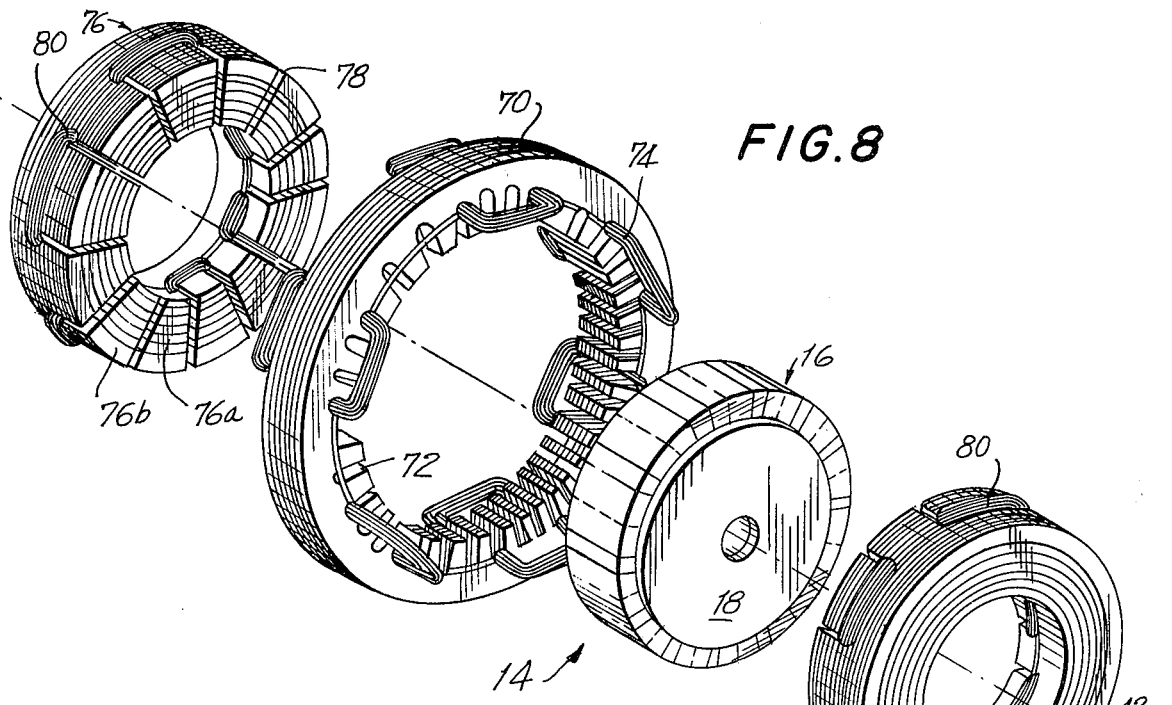
FIG. 8 is an exploded view, in perspective, of still another embodiment of the alternator which includes an intermediate stator section and axial end stator sections, with each of the sections provided with armature windings which are arranged to couple associated fluxes at the rotor.
Figure 9:
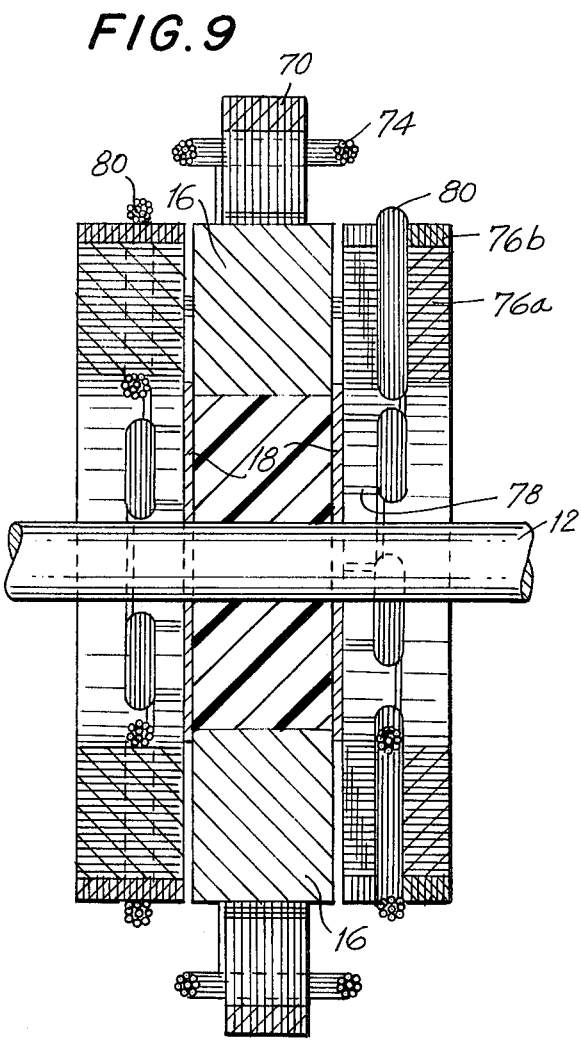
FIG. 9 is an enlarged cross-sectional view, taken on a diametrical plane, of the embodiment shown in FIG. 8.

A still further embodiment of the invention is illustrated in FIGS. 8 and 9, wherein an alternator 68 includes an intermediate stator section 70 surrounding the peripheral surface 14a of the rotor 14. The intermediate stator section 70 is provided with radial slots 72 as shown which accommodate armature coils or windings 74. Axial end stator sections 76 are provided each of which is proximate to another axial surface 14b, 14c of the rotor. The armature windings 74 are arranged for coupling to the field flux at the rotor peripheral surface 14a. The end stators 76 are provided with radial slots 78 as shown to accommodate armature windings 80 which are arranged for coupling to the field flux at the rotor axial surfaces 14b, 14c.

Advantageously, the intermediate stator section 70 is formed of axially stacked laminations. The axial end stator sections may be formed of concentric laminations 76a covered by a layer of axially stacked laminations 76b. As may be the case for the laminations 62a in FIGS. 6 and 7, the laminations 76a may either be a plurality of concentric stacked laminations or may be in the nature of a continuous spiral lamination.

In actuality, the embodiment of FIGS. 8 and 9 is a combination of the embodiments shown in FIGS. 1-3, on the one hand, and in FIGS. 6 and 7, on the other hand. The alternator 68 combines both direct peripheral field flux pick-up as well as direct axial or lateral field flux pick-up. In all the cases, as described, full advantage is taken of the multi-sided or multi-faceted field flux as it is established about the three rotating surfaces of the rotor and, these flux fields are all used, directly or indirectly, to induce and, therefore, enhance the voltages generated in the respective stator armature coils or windings.

Effectiveness of the subject invention, in terms of increased voltage generation, capability per rotor revolution, was observed to be as follows:

Single Armature Embodiment (FIGS. 1-3), 50-60% increase.
Dual Disc Armature Embodiment (FIGS. 6 and 7), 160-175% increase.
Triple Armature Embodiment (FIGS. 8-10), 200% increase.

Effectiveness of the subject invention in terms of energy conservation (with respect to the electromagnetic rotor embodiment only, FIGS. 4 and 5) was observed to be an amount approximating 65% of the input energy normally required to achieve the same output voltage. To state it in another way, normal input energy supplied to this rotor would triple its excitation capability and result in a three-fold output voltage.

Figure 10:
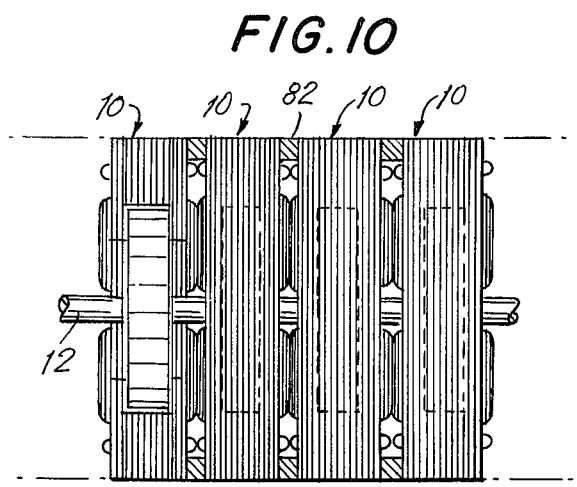
FIG. 10 illustrates the manner in which the alternators in accordance with the present invention may be stacked or cascaded along a common driven shaft, with the individual alternators being of the type illustrated in FIGS. 1-3.

In FIG. 10, a plurality of like alternators 10 are shown which are cascaded along a common shaft 12 coupled to the rotors of the respective fields. For this purpose, spacers 82 may be utilized to join and prevent relative movement between the alternators. While the alternators 10, shown in FIGS. 1-3, have been shown cascaded, it should be obvious that any of the other alternators which have been described may likewise be cascaded in a similar manner.

It is recognized that the descriptions herein have been of representative embodiments, and that variations and modifications may be possible without departing from the spirit of the invention. Thus, for example, the permanent magnets 16 may have any cross-sectional configuration or shape. Depending on the shape selected, these magnets may be secured to the nonmagnetic rotor drum 14 either by use of an epoxy cement, a press fit or any other suitable conventional means. Also, while the principle of the present invention has been described in connection with AC alternators, it should be obvious to a person skilled in the art that the same principles can easily be applied to other types of electrical rotating machines, with different degrees of advantage. It is anticipated that all of such variations and modifications come within the scope of the present invention if they come within the scope of the claims that follow.

What is claimed is:

1. An alternator comprising a driver shaft; a disc-like rotor mounted on said shaft for rotation therewith and having peripheral and axial surfaces, said rotor incorporating a plurality of alternating magnetic poles each of which establishes a three sided excitation magnetic flux field at the peripheral surface and at both axial surfaces of said rotor; and a stator including armature coils distributed about substantially central portion of said stator and arranged proximate to said rotor to magnetically couple with the flux at said peripheral and axial surfaces to thereby enhance voltage induction, wherein said stator includes said central portion spaced proximate to said rotor peripheral surface, and axial radially directed substantially flat wall portions proximate to and in opposed relationship to respective ones of said rotor axial surfaces, said axial wall portions causing the flux at said rotor axial surfaces to be coupled to said armature coils by means of said stator axial wall portions.

2. An alternator as defined in claim 1, wherein said stator comprises laminations stacked in the axial direction.

3. An alternator as defined in claim 1, wherein said rotor comprises a solid drum having at least peripheral portions thereof magnetized throughout the axial thickness thereof to establish a magnetic flux at all of said rotor surfaces.

4. An alternator as defined in claim 1, wherein said rotor comprises a non-magnetic drum having axially directed recesses about the periphery thereof substantially equally spaced from each other, said plurality of alternating magnetic poles comprising permanent magnet sections set into said recesses and having lengths substantially equal to the axial thickness of said rotor to thereby expose said permanent magnetic sections at said peripheral and axial surfaces of said rotor.

5. An alternator as defined in claim 4, further comprising a retaining circular plate abutting against each axial surface of said rotor and having a diameter selected to engage said permanent magnet sections to thereby prevent relative axial shifting between said non-magnetic drum and said permanent mangetic sections.

6. An alternator as defined in claim 4, wherein said permanent magnetic sections are arranged to provide opposing magnetic polarities along the peripheral or circumferential direction of said rotor.

7. An alternator as defined in claim 1, wherein a plurality of like alternators are cascaded along a common shaft coupled to the rotors of all the alternators.

8. An alternator comprising a driver shaft; a rotor mounted on said shaft for rotation therewith and having peripheral and axial surfaces, said rotor incorporating a plurality of alternating magnetic poles each of which establishes a three sided excitation magnetic flux field at the peripheral surface and at both axial surfaces of said rotor; and a stator structure including armature coils distributed thereon and arranged proximate to said rotor to magnetically couple with the flux at said peripheral and axial surfaces to thereby enhance the voltage induction, wherein said stator includes axial end sections; armature coils on said axial end sections proximate to said rotor axial surfaces; and pole extensions projecting axially inwardly from each axial end section into proximity with said peripheral surface of said rotor, whereby the peripheral flux of said rotor is coupled to said armature coils on said rotor axial surfaces through said pole extensions.

9. An alternator as defined in claim 8, wherein said pole extensions are formed of laminations stacked in the axial direction.

10. An alternator as defined in claim 8, wherein said axial end sections are formed of concentric laminations.

11. An alternator as defined in claim 1, wherein said poles are hollow.

12. An alternator as defined in claim 8, wherein said rotor comprises a solid drum having at least peripheral portions thereof magnetized throughout the axial thickness thereof to establish a magnetic flux at all of said rotor surfaces.

13. An alternator as defined in claim 8, wherein said rotor comprises a non-magnetic drum having axially directed recesses about the periphery thereof substantially equally spaced from each other, said plurality of alternating magnetic poles comprising permanent magnet sections set into said recesses and having lengths substantially equal to the axial thickness of said rotor to thereby expose said permanent magnetic sections at said peripheral and axial surfaces of said rotor.

14. An alternator as defined in claim 13, further comprising a retaining circular plate abutting against each axial surface of said rotor and having a diameter selected to engage said permanent magnet sections to thereby prevent relative axial shifting between said disc and said permanent magnetic sections.

15. An alternator as defined in claim 13, wherein said permanent magnet sections are arranged to provide opposing magnetic polarities along the peripheral or circumferential direction of said rotor.

16. An alternator as defined in claim 8, wherein a plurality of like alternators are cascaded along a common shaft coupled to the rotors of all the alternators.

17. An alternator comprising a driver shaft; a rotor mounted on said shaft for rotation therewith and having peripheral and axial surfaces, said rotor incorporating a plurality of alternating magnetic poles each of which establishes a three sided excitation magnetic flux field at the peripheral surface and at both axial surfaces of said rotor; and a stator structure including armature coils distributed thereon and arranged proximate to said rotor to magnetically couple with the flux at said peripheral and axial surfaces to thereby enhance voltage induction, wherein said stator includes an intermediate stator section surrounding the peripheral surface of said rotor, and axial end stator sections each proximate to another of said axial surfaces of said rotor, armature windings being provided on said intermediate stator section for coupling to the flux at said rotor peripheral surface and on said axial end stator sections for coupling to the flux at said rotor axial surfaces.

18. An alternator as defined in claim 17, wherein said rotor comprises a solid drum having at least peripheral portions thereof magnetized throughout the axial thickness thereof to establish a magnetic flux at all of said rotor surfaces.

19. An alternator as defined in claim 17, wherein said rotor comprises a non-magnetic drum having axially directed recesses about the periphery thereof substantially equally spaced from each other, said magnetizing means comprising permanent magnet sections set into said recesses and having lengths substantially equal to the axial thickness of said rotor to thereby expose said permanent magnetic sections at said peripheral and axial surfaces of said rotor.

20. An alternator as defined in claim 19, further comprising a retaining circular plate abutting against each axial surface of said rotor and having a diameter selected to engage said permanent magnetic sections to thereby prevent relative axial shifting between said non-magnetic drum and said permanent magnetic sections.

21. An alternator as defined in claim 19, wherein said permanent magnetic sections are arranged to provide opposing mangetic polarities along the peripheral or circumferential direction of said rotor.

22. An alternator as defined in claim 17, wherein a plurality of like alternators are cascaded along a common shaft coupled to the rotors of all the alternators.

23. An alternator as defined in claim 17, wherein said intermediate stator section is formed of axially stacked laminations.

24. An alternator as defined in claim 17, wherein said axial end stator sections are formed of concentric laminations covered by a layer of axially stacked laminations.

25. An alternator comprising a driver shaft; a rotor mounted on said shaft for rotation therewith and having peripheral and axial surfaces, said rotor incorporating a plurality of alternating magnetic poles each of which establishes a three sided excitation magnetic flux field at the peripheral surface and at both axial surfaces of said rotor; and a stator structure including armature coils distributed thereon and arranged proximate to said rotor to magnetically couple with the flux at said peripheral and axial surfaces to thereby enhance voltage induction, wherein said rotor comprises an interlacing pole structure consisting of two sets of poles with each set being mounted on another one of two axially opposed core structure walls; and a rotor coil for magnetizing said core structured walls and said poles, said poles being mounted on one of said core structure walls and extending axially toward the other of said wall.

* * * * *